United States Patent
Janssen et al.

(10) Patent No.: US 8,822,631 B2
(45) Date of Patent: Sep. 2, 2014

(54) PROCESS FOR THE PRODUCTION OF PA-410 AND PA-410 OBTAINABLE BY THAT PROCESS

(75) Inventors: Pim Gerard Anton Janssen, Echt (NL); Ronald Ligthart, Echt (NL)

(73) Assignee: DSM IP Assets B.V., Heerlen (NL)

( * ) Notice: Subject to any disclaimer, the term of this patent is extended or adjusted under 35 U.S.C. 154(b) by 0 days.

(21) Appl. No.: 13/696,339

(22) PCT Filed: May 5, 2011

(86) PCT No.: PCT/EP2011/057207
§ 371 (c)(1),
(2), (4) Date: Jan. 18, 2013

(87) PCT Pub. No.: WO2011/138396
PCT Pub. Date: Nov. 10, 2011

(65) Prior Publication Data
US 2013/0211039 A1    Aug. 15, 2013

(30) Foreign Application Priority Data
May 6, 2010   (EP) .................................... 10162131

(51) Int. Cl.
*C08G 69/26* (2006.01)
*C08G 69/28* (2006.01)
*C08G 69/04* (2006.01)

(52) U.S. Cl.
CPC ............... *C08G 69/04* (2013.01); *C08G 69/26* (2013.01); *C08G 69/28* (2013.01)
USPC ............................................................ 528/335

(58) Field of Classification Search
USPC ............................................................ 528/335
See application file for complete search history.

(56) References Cited

U.S. PATENT DOCUMENTS 6,562,940 B2 * 5/2003 Kuhn et al. ................... 528/310

FOREIGN PATENT DOCUMENTS

WO  WO 00/09586  2/2000
WO  WO 00/56803  9/2000

OTHER PUBLICATIONS

International Search Report for PCT/EP2011/057207, mailed Jun. 22, 2011.
Written Opinion for PCT/EP2011/057207, mailed Jun. 22, 2011.

* cited by examiner

*Primary Examiner* — Terressa Boykin
(74) *Attorney, Agent, or Firm* — Nixon & Vanderhye P.C.

(57) ABSTRACT

A process for the production of a polymer containing monomer units of butane-1,4-diamine and 1,10-decanedioic acid (PA-410) having a viscosity number (VN) of at least 105 ml/gram includes making a solution of a salt of butane-1,4-diamine and 1,10-decanedioic acid in water, concentrating the solution of the salt at a temperature of between 100 and 180° C. and a pressure of between 1.0 and 3.0 bar to a water content of between 4 and 8 wt %, producing a prepolymer from the salt containing monomer units of butane-1,4-diamine and 1,10-decanedioic acid at a temperature of between 185 and 205° C., and thereafter subjecting the prepolymer to post condensation.

12 Claims, No Drawings

PROCESS FOR THE PRODUCTION OF PA-410 AND PA-410 OBTAINABLE BY THAT PROCESS

This application is the U.S. national phase of International Application No. PCT/EP2011/057207 filed 5 May 2011 which designated the U.S. and claims priority to EP Patent Application No. 10162131.6 filed 6 May 2010, the entire contents of each of which are hereby incorporated by reference.

The invention relates to a process for producing a polyamide containing monomer units of butane-1,4-diamine and 1,10-decanedioic acid and the polyamide obtainable by that process.

A polyamide containing monomer units of butane-1,4-diamine and 1,10-decanedioic acid is hereafter referred to as PA-410.

From Dreyfuss, Journal of polymer Science, Vol. 11(2), 201-216 (1973), a process is described in which the polymerization is carried out in a mixture of water and perchloroethylene with the aid of di-carboxylic acid chloride of 1,12-dodecanedioic acid and butane-1,4-diamine. Problems of that process are that it has a low yield and that it is not possible to produce a polymer with a molecular weight high enough for most applications.

In WO 00/09586 a process is described for producing PA-410, comprising the steps of making a solution of a salt of butane-1,4-diamine and 1,10-decanedioic acid in water, concentrating the solution at high pressure and at a temperature up to 200° C. to a water content of between 10 and 15 wt. %, producing from the salt a prepolymer containing monomer units of butane-1,4-diamine and 1,10-decanedioic acid in a second step at a temperature of 227° C. and producing a polymer in the final step by post condensation of the prepolymer in the solid state, at about 25° C. below the polymer's melting point.

A problem of that process is that the step of post-condensation takes a long time, and is not reproducible with respect to the obtained molecular weight. Furthermore, contrary to reported in WO00/09586 also in this process the polymer obtained does not have a molecular weight high enough to be successfully applied in a lot of applications of the polymer. Even after extended periods of post-condensation the obtained molecular weights, expressed as a viscosity number, are not high enough, but also a further increase cannot be detected any more. The value of many properties increases with increasing molecular weight, for example mechanical properties like for example strength and impact resistance as well as rheological properties, like for example the melt strength.

Object of the present invention is to provide a process for the production of PA-410 that does not show these problems.

Surprisingly this object is achieved with a process for the production of a polymer containing monomer units of butane-1,4-diamine and 1,10-decanedioic acid comprising the steps of:
1) making a solution of a salt of butane-1,4-diamine and 1,10-decanedioic acid in water,
2) concentrating the solution of the salt at a temperature of between 100 and 180° C. and a pressure of between 0.8 and 6.0 bar to a water content of between 2 and 8 wt %
3) producing from the salt a prepolymer containing monomer units of butane-1,4-diamine and 1,10-decanedioic acid at a temperature of between 185 and 205° C. and
4) post-condensing of the prepolymer into the polymer.

Surprisingly a faster post-condensation step is obtained. A further advantage is that at the end of the post-condensation step a polymer with a higher molecular weight may be obtained. It is very surprising that changing the conditions in the pre-polymerisation step have this positive effect on the outcome of the post-condensation step. A further advantage of the process according to the invention is that it is better reproducible.

Yet a further advantage is that a polymer with improved properties is obtained.

In the first step a mixture of butane-1,4-diamine and decanedioic acid in water is stirred to produce a solution of the salt of the diamine and the acid in water. Stirring takes preferably place in a closed vessel, that before has been flushed with an inert gas, for example nitrogen, to obtain an oxygen level in the vessel of less than 1000 ppm, more preferably less than 500 ppm. The amine and the acid are preferably supplied to the first step in stoichiometric or at least about stoichiometric quantities. More preferred, the molar ratio between the amine and acid is between 1:1 and 1:1.07 and most preferred the molar ratio is between 1:1 and 1.04:1. While stirring, the mixture is preferably heated up to a temperature between 50 and 100° C., more preferably between 80 and 95° C. After the formation of the salt, the solution is concentrated in the second step at moderate pressure and temperature of between 0.8 and 6.0 bar and between 100 and 180° C. Preferably the pressure is between 1.0 and 4 bars, more preferably the pressure is between 1.0 and 2.0 bar. Preferably the temperature is between 120 and 160° C. The concentration may take place while removing the water under distillation. The concentration step is finished when the water content in the solution is between 2 and 8 wt. %, preferably between 5 and 7 wt. %. It has been shown that it is favorable to have a low water content in the third step, because surprisingly a higher reactive pre-polymer is obtained, resulting in a higher molecular weight of the final polymer. However if the water content becomes to low in the second step the mixture must be kept at a high temperature to avoid crystallization of the salt, so that already in the second step undesired pre-polymerisation may take place. Therefore there is a narrow optimum in the water content of the reaction mixture during the production of the pre-polymer.

In the third step the vessel is suitably closed and the temperature is raised to a level of between 185 and 205° C., preferably between 190 and 200° C., more preferably between 195 and 200° C.

At the end of the third step the mixture of water and the pre-polymer is flashed in an inert atmosphere, preferably a nitrogen atmosphere. During flashing the remaining water is removed by adiabatic expansion and the pre-polymer is cooled. Thereafter the pre-polymer may be charged to a vessel for the fourth step of the post-condensation, preferably as granulate. As vessel a tumble dryer may be used. The temperature may be between 180 and 220° C., preferably between 200 and 220° C. the post-condensation is suitably carried out in a nitrogen or nitrogen/water vapor atmosphere, containing preferably at least 10 wt. % of water vapor.

The post condensation step may be stopped by cooling down the granulate, when the desired polymerization degree has been obtained.

With the process of the present invention it is now possible to produce PA-410 having a high molecular weight. Therefore the invention also relates to a PA-410 having a viscosity number (VN) of at least 100 ml/gram as measured according to ISO 307, version 2007, in 90 wt. % formic acid at 25° C., preferably at least 105 ml/gram, more preferably at least 110 ml/gram, most preferably at least 120 ml/gram. Good results are obtained at least to a VN of up to 260 ml/gram, more preferably up to 240 ml/gram.

Because of its special structure as obtained in the pre-condensation phase, the PA-410 obtainable with the process according to the invention can not only advantageously be produced very fast and if desired to a high degree of polymerization. Also the final polymer obtained after the post-condensation step is still much higher reactive, than the known PA-410. It is for example very well possible to mix the polymer at a low degree of polymerization and consequently low viscosity with reinforcing fibers and after that mixing step increase the degree of polymerization of the polymer further. In this way in a fast running process a fiber reinforced PA-410 composition may be obtained, having very good mechanical properties. It is also very well possible to produce a shaped article comprising the polymer, for example a film, or a stock shape, and increase the degree of polymerization of the polymer after that by a further condensation step, below the melting point of the polymer. In this way a shaped article with very good mechanical properties may be obtained, while it is not possible to produce such an article directly form the polymer having the same high degree of polymerization, because of the high viscosity of such a polymer.

Therefore in a preferred embodiment the invention relates to PA-410 having ([acid end groups]+[amine end groups])>b−a·VN        form. I, whereby [acid end groups] is the concentration of acid end groups in the polymer in meq/kg, and [amine end groups] is the concentration of amine end groups in the polymer in meq/kg, a is equal to 0.77, b is equal to 160 and VN is viscosity number in ml/gram. 1 meq is equal to $10^{-3}$ mol. Preferably b is equal to 165, more preferably b is equal to 170.

Preferably form. I is applicable, however with the proviso that ([acid end groups]+[amine end groups])>20 meq/kg, more preferably >30 meq/kg, even more preferably >30 meq/kg. This results in an even further increase in post-condensation rate, obtained viscosity number and reactivity of the final polymer.

The PA-410 according to the invention may contain next to monomer units of butane 1,4-diamine and 1,10-decanedoic acid co-monomer units of further di-amines and/or di-acids and/or aminoacids. Preferably the PA-410 contains less than 20 wt. % of co-monomer units, more preferably less than 10 wt. %, more preferably less than 2 wt. %, most preferably less than 0.1 wt. %.

The PA-410 according to the invention may be compounded with reinforcing agents, like for example glass fibers, carbon fibers, whiskers etc and further usual additives.

The invention also relates to shaped articles comprising PA-410 of the present invention. The PA-410 according to the present invention is especially suitable for producing shaped articles by an extrusion process, for example a blow molding process and a process of film extrusion. This is because for shaped articles produced by an extrusion process the higher viscosity number of the PA-410 according to the invention and the resulting better mechanical properties are extra beneficial.

The invention also relates to a process to increase the degree of polymerization of PA-410 by heating a fiber reinforced granulate or a shaped product of PA-410 below its melting point. Preferably the degree of polymerization is increased so that the viscosity number has been increased with at least 2 ml/gram, more preferably with at least 5 ml/gram.

EXAMPLES

Compounds Used 1,10-decanedioic acid, delivered by Dong Fang from China.
Butane-1,4-diamine, delivered by DSM, the Netherlands.

Measurements
Viscosity Number (VN).

The viscosity number was determined according to ISO 307, version 2007, by dissolving the PA-410 samples in formic acid (90 wt. %) in a concentration of 0.005 g/ml and determining of the viscosity number by an Ubelohde viscometer by measuring at 25° C. the times of flow of the solvent (t0) and of the solution (t1) and calculating the viscosity number by the formulae VN=[(t1/t0) 1]×200 ml/gram.
End Groups.

The carboxyl end groups were potentiometrically determined in o-cresol by means of a titration with tetrabutyl ammonium hydroxide.

The amino end groups were potentiometrically determined in phenol by means of a titration with hydrochloric acid.

Comparative Experiment A

Preparation of PA-410, According to Example 1 of WO00/09586

350 grams of 1.10-decanedoic acid, 157 grams of butane-1,4-diamine and 420 grams of water are stirred in an autoclave for 30 minutes at 90° C. to obtain a solution of the salt of the diamine and the acid in a concentration of 55 wt. % in water. Then water is removed by first raising the temperature in 10 minutes to 180° C., removing about half of the amount of water under distillation and then raising the temperature to 200° C. and further removing water through distillation, to obtain a concentrated solution containing 10 wt. % of water. At a temperature of 200° C. and 10 wt % of water, the pressure lies above 6 bar. Then the autoclave is closed and the temperature in the autoclave is raised until 227° C. The pre-polymerisation is performed during 30 minutes at the same temperature, after which the content of the autoclave is flashed in a nitrogen atmosphere and the prepolymer was granulated and cooled.

The granules of the pre-polymer were placed in a tumble dried and post-condensed at a temperature of 220° C. in a nitrogen/water vapor atmosphere (75/25 wt. %) for 48 hours. Samples were taken after 24 hours and 48 hours of post-condensation. Viscosity number and concentration of end groups were measured and reported in table 1.

Comparative Experiment B

The same as comparative experiment A, but now the water content of the concentrated solution used for the pre-polymerisation step was 15 wt. %. Samples were taken after 24 hours and 48 hours of post-condensation. Viscosity number and concentration of end groups were measured and reported in table 1.

Comparative Experiment C

The same as comparative experiment A, but now the temperature during the pre-condensation step was raised until 235° C.
Samples were taken after 24 hours and 48 hours of post-condensation. Viscosity number and concentration of end groups were measured and reported in table 1.

Example I

As comparative experiment A, but in the concentration step the temperature was only raised until 150° C. and the solution was concentrated until a water content of 6 wt. %. At a temperature of 150° C. and a water content of 6 wt % the pressure lies around 1.2 bar. The temperature in the pre-polymerisation step was 200° C.

Samples were taken after 24 hours and 48 hours of post-condensation. Viscosity number and concentration of end groups were measured and reported in table 1.

TABLE 1

| property | unit | Comp exp A | Comp exp B | Comp exp C | Example I |
|---|---|---|---|---|---|
| [amine]* | meq/kg | 7 | 14 | 8 | 37 |
| [acid]* | meq/kg | 87 | 61 | 91 | 28 |
| [amine + acid]* | meq/kg | 94 | 75 | 99 | 65 |
| VN (24 h) | ml/g | 92 | 90 | 82 | 149 |
| VN (48 h) | ml/g | 101 | 98 | 88 | 179 |

*end-groups were only measured on the samples taken after 24 h.

From the results it is clear that for a PA-410 produced according to the state of the art after a normal period of post-condensation the viscosity number is still very low and much below 100 gram/ml. An extension of the normal period with even an extra 24 to a total post-condensation period of 48 hours does not result in a considerable increase in viscosity number.

After even further post-condensation it is not possible to measure a further increase in VN and that problems might occur with discoloration of the polymer.

This while the polymer produced with the process according to the invention shows a strong increase in viscosity number as a function of condensation time.

In the comparison of comp. experiment A and B as well as experiment 1 it is shown that decreasing the water content at the end of step 2 results in a higher viscosity number of the final polymer.

In the comparison of comparative experiment A and C as well as example 1 it is shown that decreasing the reaction temperature in the pre-condensation step (step 3) results in a higher number of the final polymer.

The invention claimed is:

1. A process for the production of a polymer containing monomer units of butane-1,4-diamine and 1,10-decanedioic acid (PA-410) comprising the steps of:
   1) making an aqueous salt solution comprising a salt of butane-1,4-diamine and 1,10-decanedioic acid in water,
   2) concentrating the aqueous salt solution at a temperature of between 100 and 180° C. and at a pressure of between 0.8 and 6.0 bar to achieve a water content of the aqueous salt solution of between 2 and 8 wt %,
   3) producing from the salt a prepolymer containing monomer units of butane-1,4-diamine and 1,10-decanedioic acid at a temperature of between 185 and 205° C., and thereafter
   4) subjecting the prepolymer to post-condensation to obtain a PA410 polymer having a viscosity number (VN) of at least 100 ml/gram as measured according to ISO 307, version 2007, in 90 wt. % formic acid at 25° C.

2. The process according to claim 1, wherein the temperature employed in step 2) to concentrate the aqueous salt solution is between 120 and 160° C.

3. The process according to claim 1, wherein step 2) is practiced by concentrating the aqueous salt solution to a water content of between 5 and 7 wt. %.

4. The process according to claim 1, wherein the temperature employed in step 3) to produce the prepolymer is between 190 and 200° C.

5. A polymer comprising monomer units of butane-1,4-diamine and 1,10-decanedioic acid (PA-410) having a viscosity number (VN) of at least 105 ml/gram as measured according to ISO 307, version 2007, in 90 wt. % formic acid at 25° C.

6. The PA-410 according to claim 5, wherein VN is at least 110 ml/gram.

7. The PA-410 according to claim 5, wherein $$([acid\ end\ groups]+[amine\ end\ groups])>b-a\cdot VN \qquad \text{(formulae I)},$$

whereby [acid end groups] is the concentration of acid end groups in the polymer in meq/kg, and [amine end groups] is the concentration of amine end groups in the polymer in meq/kg, a is equal to 0.77 and b is equal to 160 and VN is the viscosity number in ml/gram.

8. The PA-410 according to claim 7, wherein b is equal to 165.

9. The PA-410 according to claim 7, wherein [acid end groups] and [amine end groups] are present according to formulae I such that [acid end groups]+[amine end groups] >20 meq/kg.

10. A shaped article comprising the PA-410 according to claim 5.

11. The shaped article according to claim 10, which is produced by an extrusion process.

12. A polymer comprising monomer units of butane-1,4-diamine and 1,10-decanedioic acid (PA-410) which is produced by the process according to claim 1.

* * * * *